United States Patent
Gupta

(10) Patent No.: US 7,164,499 B1
(45) Date of Patent: Jan. 16, 2007

(54) BLOCK QUANTIZATION METHOD FOR COLOR HALFTONING

(75) Inventor: Maya Rani Gupta, Menlo Park, CA (US)

(73) Assignee: Ricoh Co. Ltd., Tokyo (JP)

( * ) Notice: Subject to any disclaimer, the term of this patent is extended or adjusted under 35 U.S.C. 154(b) by 1094 days.

(21) Appl. No.: 10/185,894

(22) Filed: Jun. 27, 2002

(51) Int. Cl.
H04N 1/52 (2006.01)
H04N 1/58 (2006.01)

(52) U.S. Cl. ............ 358/1.9; 358/3.17; 358/3.26; 358/533; 358/535

(58) Field of Classification Search ............ 358/1.9, 358/3.06, 3.13, 3.17, 3.26, 533–536
See application file for complete search history.

(56) References Cited

U.S. PATENT DOCUMENTS 5,493,416 A * 2/1996 Fan .................. 358/465
5,602,943 A * 2/1997 Velho et al. .......... 358/536

OTHER PUBLICATIONS

Anastassiou, Dimitris, Error Diffusion Coding for A/D Conversion, IEEE Transactions On Circuits And Systems, vol. 36, No. 9, Sep. 1989, pp. 1175-1186.
Breaux, Nancy, et al., Wavelet methods for compression, rendering, and descreening in digital halftoning, Proc. Of the SPIE, vol. 3078, 1997, pp. 656-667.
Damera-Venkata, Niranjan, et al., FM Halftoning Via Block Error Diffision, Proc. Of IEEE ICIP, 2001, pp. 1081-1084.
Floyd, Robert W., et al., An Adaptive Algorithm for Spatial Greyscale, Proceedings of the Society for Information Display, vol. 17, No. 2, 1976, pp. 75-77.
Gooran, Susan, Halftoning and Color Noise, IS& T/SID Ninth Color Imaging Conference, 2001, pp. 184-188.
Gupta, Maya, et al., Block Quarterization: A New Method For Color Halftoning, Proc. Of the IEEE ICIP, 2000, 4 pages.
Katsavounidis, Ioannis, et al., A Multiscale Error Diffusion Technique for Digital Halftoning, IEEE Transactions On Image Processing, vol. 6, No. 3, Mar. 1997, pp. 483-490.
Katsavounidis, Ioannis, et al., A Recursive Multiscale Error-Diffusion Technique for Digital Halftoning[1], SPIE Conference Proceedings, vol. 2094, 1993, pp. 487-498.
Pappas, Thrasyvoulos N, et al., Least-Squares Model-Based Halftoning, IEEE Transactions On Image Processing, vol. 8, No. 8, Aug. 1999, pp. 1102-1116.
Wong, Ping Wah, Mean Matching Halftoning on a Rotated Quadtree Structure, Proc. SPIE, vol. 2657, 1996, pp. 448-455.
Zakhor, Avideh, et al., A New Class of B/W and Color Halftoning Algorithms*, Proc. ICASSP, vol. 4, 1991, pp. 2801-2804.

* cited by examiner

*Primary Examiner*—Scott A. Rogers
(74) *Attorney, Agent, or Firm*—Blakely, Sokoloff, Taylor & Zafman LLP

(57) ABSTRACT

A method and apparatus for performing color halftoning using block quantization is disclosed. In one embodiment, the method comprises dividing an input image into a plurality of blocks, clustering pixels in each of the plurality of blocks into a plurality of color groups, block quantizing each of the plurality of color groups for each of the plurality of blocks to a representative color value, and creating an output halftone image having a distinct block associated with each block in the plurality of blocks, with the representative color value for each group in each distinct block being approximated over a spatial area covered by the group in said each distinct block.

58 Claims, 11 Drawing Sheets

G1    G2    G3

Example 1

Example 2

Example 3

| 1 | 9 | 5 | 11 |
|---|---|---|---|
| 16 | 13 | 8 | 3 |
| 10 | 4 | 15 | 6 |
| 7 | 14 | 2 | 12 |

FIG. 6A

| K | M | K | M |
|---|---|---|---|
| Y | M | R | K |
| M | K | M | R |
| R | M | K | M |

FIG. 6B

| 1 | 9 | 5 | 11 |
|---|---|---|---|
| 16 | 13 | 8 | 3 |
| 10 | 4 | 15 | 6 |
| 7 | 14 | 2 | 12 |

| C | C | K | R |
|---|---|---|---|
| C | C | R | K |
| C | C | R | K |
| R | R | K | C |

| 74 | 122 | 58 | 70 | 118 | 54 | 73 | 121 | 57 | 69 | 117 | 53 |
|---|---|---|---|---|---|---|---|---|---|---|---|
| 138 | 10 | 106 | 134 | 6 | 102 | 137 | 9 | 105 | 133 | 5 | 101 |
| 26 | 90 | 42 | 22 | 86 | 38 | 25 | 89 | 41 | 21 | 85 | 37 |
| 66 | 114 | 50 | 78 | 126 | 62 | 65 | 113 | 49 | 77 | 125 | 61 |
| 130 | 2 | 98 | 142 | 14 | 110 | 129 | 1 | 97 | 141 | 13 | 109 |
| 18 | 82 | 34 | 30 | 94 | 46 | 17 | 81 | 33 | 29 | 93 | 45 |
| 72 | 120 | 56 | 68 | 116 | 52 | 75 | 123 | 59 | 71 | 119 | 55 |
| 136 | 8 | 104 | 132 | 4 | 100 | 139 | 11 | 107 | 135 | 7 | 103 |
| 24 | 88 | 40 | 20 | 84 | 36 | 27 | 91 | 43 | 23 | 87 | 39 |
| 64 | 112 | 48 | 76 | 124 | 60 | 67 | 115 | 51 | 79 | 127 | 63 |
| 128 | 0 | 96 | 140 | 12 | 108 | 131 | 3 | 99 | 143 | 15 | 111 |
| 16 | 80 | 32 | 28 | 92 | 44 | 19 | 83 | 35 | 31 | 95 | 47 |

FIG. 8

| 82 | 49 | 137 | 31 | 112 | 65 | 76 | 17 | 107 | 42 | 135 | 67 |
|---|---|---|---|---|---|---|---|---|---|---|---|
| 127 | 8 | 93 | 56 | 129 | 0 | 121 | 28 | 95 | 3 | 116 | 57 |
| 25 | 14 | 73 | 105 | 26 | 92 | 50 | 134 | 66 | 84 | 37 | 101 |
| 63 | 118 | 43 | 142 | 12 | 79 | 59 | 110 | 41 | 132 | 10 | 87 |
| 139 | 33 | 94 | 70 | 114 | 38 | 123 | 7 | 21 | 74 | 119 | 54 |
| 126 | 75 | 1 | 48 | 99 | 19 | 141 | 69 | 89 | 46 | 102 | 23 |
| 35 | 100 | 58 | 125 | 34 | 81 | 52 | 103 | 32 | 143 | 71 | 9 |
| 72 | 113 | 18 | 140 | 68 | 91 | 6 | 115 | 13 | 124 | 39 | 88 |
| 138 | 45 | 90 | 5 | 109 | 27 | 130 | 60 | 80 | 55 | 108 | 15 |
| 98 | 24 | 78 | 51 | 122 | 44 | 86 | 22 | 97 | 30 | 133 | 61 |
| 4 | 128 | 64 | 104 | 11 | 136 | 53 | 111 | 2 | 120 | 47 | 85 |
| 29 | 117 | 40 | 83 | 20 | 96 | 36 | 131 | 62 | 77 | 16 | 106 |

FIG. 9

BLOCK QUANTIZATION METHOD FOR COLOR HALFTONING

FIELD OF THE INVENTION

The present invention relates to the field of color halftoning; more particularly, the present invention relates to applying a block quantization technique to color halftoning.

BACKGROUND OF THE INVENTION

Color halftoning is an important problem for commercial and consumer imaging devices. Color halftoning attempts to represent an image in multi-bit (e.g., 24 bits) color as an image with only a few colors, such as 4 inks (and white), and possibly increased spatial resolution. This may be done by alternating colors from the limited palette so that after the eye key averages the colors the visually perceived color appears the same as the original color.

Judging color halftoning algorithms can be difficult due to the subjective nature of vision. Specific goals in halftoning algorithms include color matching, simple computation, low graininess, artifact minimization, and reduction of post-processing effects. The relative importance of each of these goals depends upon the human viewer, the expected viewing distance, and the target image.

Color matching itself has at least two objectives: closeness of individual input and output colors and consistent errors. Computation issues include running speed, parallelizability, memory size, and complexity. Graininess can be described as the ability to perceive distinct output colors (instead of the colors blending perfectly). Perceived grainess is a function, in part, of the dpi.

Detail information may be lost due to either poor spatial resolution or poor color resolution (or a combination of both). Artifacts are a general term for anything not desirable that is a result of the algorithm (as opposed to noise), including speckles, streaks, ghosts, gridding, texture, and very importantly, false contouring (also known as banding).

Post-processing effects are a concern because a halftoned image is not necessarily 'finished' when it is halftoned. Various image processing operations may still be performed on it, from downsampling to compression to edge enhancement. A halftoning algorithm may affect the success and ease of these operations.

Different techniques have been devised for halftoning, including dithering, error diffusion and iterative methods. See Kang, Henry, "Digital Color Halftoning", SPIE and IEEE Press, 1999, and Ulichney, R., "Digital Halftoning". MIT Press, 1987. Most color halftoning techniques simply extend a black-and-white halftoning technique to each of the three color planes individually. While computationally efficient, such component-wise extensions implicitly assume a mathematical linearity of ink colors. However, the subtractive color mixing in printing is nonlinear, and thus such plane-by-plane halftoning methods are suboptimal.

Dithering consists of adding a pseudorandom 2D periodic signal to each color component of the image, then quantizing each pixel to the closest output color. The dither signal is designed to generate patterns of alternating colors that blend to the eye. Different styles of dithering include clustered dot dithering, distributed dot dithering, and ordered dot dithering. Dithering with white noise does not achieve results as visually pleasing as more ordered dithering. Dithering is known to suffer from noticeable periodic patterning. Many efforts have tried to improve dithering. The application of dithering to color is in the art. For more information, see A. Karun, et al., "New Methods for Dithering of Color Images," Proc. of the IEEE Workshop on Nonlinear Signal/Image Processing, 1995.

While dithering is a point process (i.e., the output at each pixel depends only on the input pixel and possibly external factors like the dither signal), error diffusion diffuses the quantization error at each pixel to its neighboring pixels based on a directional spatial filter that sends a portion of the error in each forward direction. As a result, the error diffusion halftoning process adds high frequency noise. Since the goal is for the eye to blend the colors and not notice the actual mosaic of colors, this highpass filter effect of error diffusion exploits the eyes' insensitivity to high frequency noise. Thus, error diffusion yields a blue spatial spectrum. The idea that this blue noise is more visually pleasing is well-established.

Error diffusion works well in practice, giving good image quality at medium ink densities and naturally sharpening edges. See Floyd, R. W., Steinberg, L., "An adaptive algorithm for spatial greyscale", Proceedings of the Society for Information Display, vol 17, no 2, pg 75–77, 1976. However, error diffusion has some drawbacks. It is a greedy algorithm in that it locally optimizes; that is, it does the best job it can at each pixel in space. Since the error is diffused forward, it is directional and cannot provide true joint optimization over a local region. An error may get diffused far beyond the point at which the eye is averaging color. Error diffusion artifacts include speckles, streaks, transient and edge effects, and grid effects at certain intensities. The feedback loop required for error diffusion can be a hindrance to parallel implementation of the algorithm. Error diffusion techniques that are block-based include Fan's work. For more information on Fan's work, see Kang, Henry. "Digital Color Halftoning." SPIE and IEEE Press, 1999, and more recently, Damera-Venkata's work, Damera-Venkata N., Evans, B. "FM Hafltoning via block error diffusion." Proc. of IEEE ICIP, pg. 1081–1084, 2001.

Improvements have been made in error diffusion over many years. Efforts have been made in such directions as minimizing structural artifacts, making the feedback filter adaptive, and using neural networks.

Also, there are successful black-and-white halftoning techniques that use perceptual and printer models, but these require complex extensions for color halftoning.

There are additional black and white algorithms that consider the idea of mean-matching. For example, one multiscale halftoning algorithm begins at the resolution of the whole image and sets the output image average gray level equal to the input image average gray level. Then the next higher level of resolution proportionately splits up the average gray level amongst four quadrants based on their average gray levels. This process continues through the levels of resolution until each pixel is quantized black or white. For example, see Breaux, et al., "Wavelet Methods for Compression, Rendering, and Descreening in Digital Halftoning," SPIE Vol. 3078, 1997; Breaux N. and Chu C. H. "Wavelet Methods For Compression, Rendering, And Descreening In Digital Halftoning," Proc. of the SPIE, vol 3078, pg 656–667, 1997 (calculate wavelet averages and then use dithering to approximate these gray-level averages); P. W. Wong, "Halftoning by Multiscale Dot Distribution," Proc. IEEE Int. Conference on Image Processing, Vol. III, 1995; P. W. Wong, "Mean matching Halftoning on a Rotated Quad-tree Structure," Human Vision and Electronic Imaging," Proc. SPIE 2657, 1996 (matching the average gray levels of the input and output image at various resolutions). See also Katsavoundidis, I., and Kuo, C. C., "A Recursive Multiscale Error-Diffusion Technique for Digital Halftoning", SPIE Conference Proceedings, vol 2094, 1993, and Katsavoundidis, I., and Kuo, C. C., "A Multiscale Error Diffusion Technique For Digital Halftoning," IEEE Transactions on Image Processing, vol 6, no 3, March 1997 (Katsavounidis and Kuo aim to match intensities at different resolutions, but use a 'multiscale error-diffusion' technique).

In another prior art solution, the average gray levels of the input and output images are generated at various resolutions. In still another prior art solution, wavelet averages are calculated and then dithering is used to approximate these gray-level averages. More specifically, the image is first compressed with wavelets and then the wavelet coefficients are used at each level as the average gray level to determine how white dots should be divvied up amongst the quadrants. This technique does not go down to the pixel level and tessellates the chosen number of white dots using a clustered dot or dispersed dot dither. Their results suffer from horizontal and vertical artifacts and false contouring.

SUMMARY OF THE INVENTION

A method and apparatus for performing color halftoning using block quantization is disclosed. In one embodiment, the method comprises dividing an input image into a plurality of blocks, clustering pixels in each of the plurality of blocks into a plurality of color groups, block quantizing each of the plurality of color groups for each of the plurality of blocks to a representative color value, and creating an output halftone image having a distinct block associated with each block in the plurality of blocks, with the representative color value for each group in each distinct block being approximated over a spatial area covered by the group in said each distinct block.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 6A–6B illustrate a block having only one color group.

FIG. 8 illustrates an exemplary mask.

FIG. 9 illustrates another exemplary mask.

DETAILED DESCRIPTION OF THE PRESENT INVENTION

Figure 1:
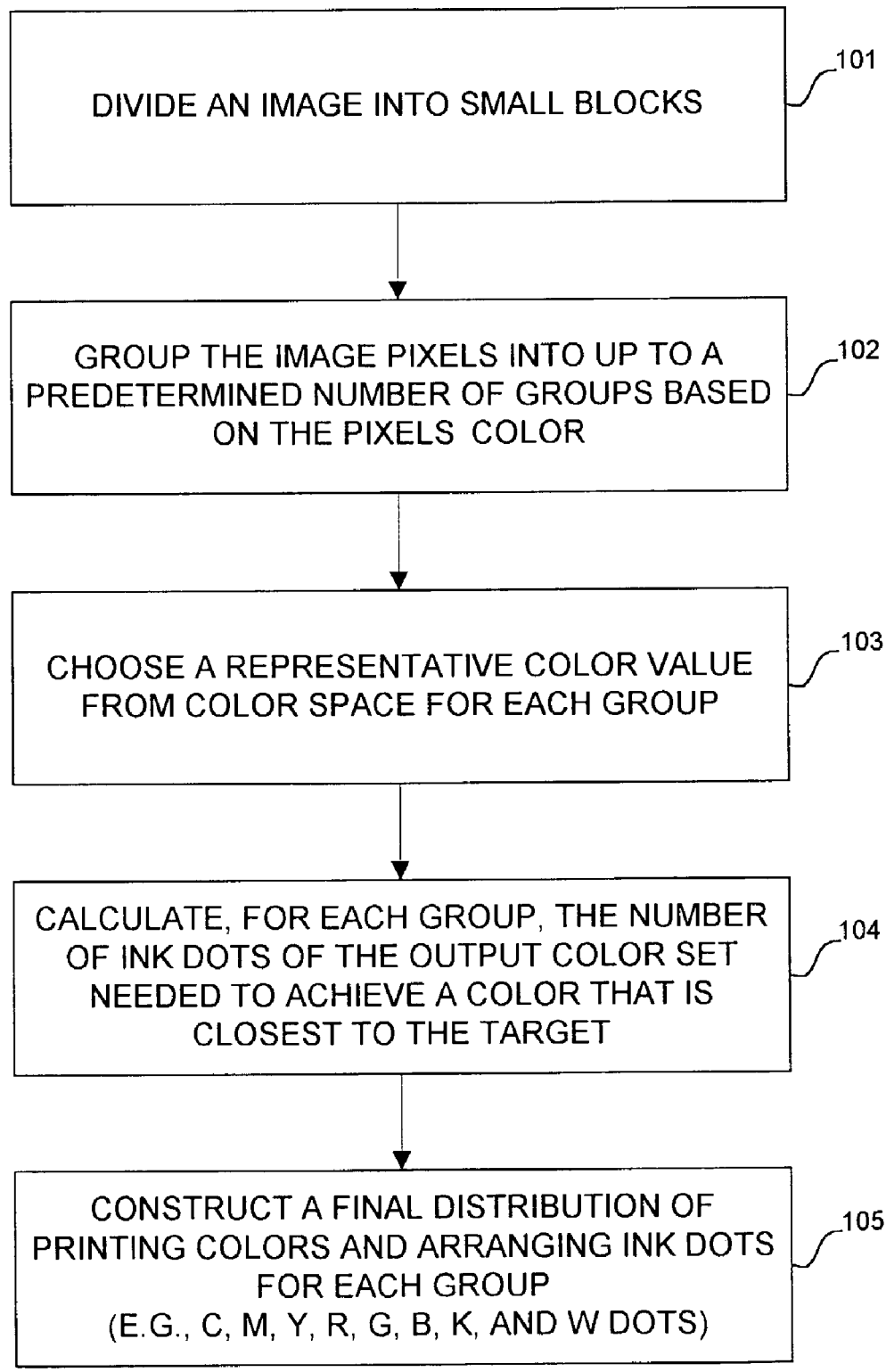
FIG. 1 is a flow diagram of one embodiment of a process for performing block color quantization halftoning.

The present invention provides halftoning techniques in which the color average over a small block of the input image is matched with the color average of the corresponding small block in the output image. More specifically, in the BCQ halftoning technique described herein, an image is divided into blocks and the representative input color is matched to the representative output color of each group of each small block, with the aim of creating a halftone that is perceived with minimal distortion with respect to how the original image is perceived. In this approach with BCQ, it is assumed that the eye low-pass filters in the input domain as well as in the halftone, but not over edges. Thus, the technique attempts to minimize the distortion between averages of consistent patches of color. Within each block, colors are clustered in order to retain edge information. In one embodiment, the technique separates blocks into color groups by clustering, and assigns distributions of C, M, Y, K, W, R, G, B to achieve a representative color. In one embodiment, this halftoning methodology arranges the chosen ink dots using a dither mask, either a dispersed dot mask or a clustered dot mask, and thus can avoid isolated dot printing problems and other physical device issues that hamper the prior art.

The idea behind the block color quantization halftoning technique is that by matching the mean color value of very small smooth color areas in the input image and the output halftone, a fast, quality halftone may be achieved. The human visual system averages colors that are close in color value but perceives as edges colors that are far apart in color value. In one embodiment, each small block of the image is processed independently to make the algorithm parallelizable. In one embodiment, for each small block, the colors are clustered into up to three different color groups. Each of these color groups is then "block quantized" to some representative value, such as an average. Then, a halftone is created that recreates each color group's color over the spatial area covered by the group in each block.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a flow diagram of one embodiment of a process for performing block color quantization halftoning. The process is performed by processing logic that may comprise hardware (e.g., circuitry, dedicated logic, etc.), software (such as is run on a general purpose computer system or a dedicated machine), or a combination of both.

Referring to FIG. 1, processing logic divides an image into small blocks (processing block 101). After dividing the image into small blocks, processing logic groups the image pixels in each block into one or more groups up to a predetermined number of groups (e.g., 3, 4) based on the pixels' color (processing block 102). After grouping the image pixels, processing logic chooses a representative color value from color space for each group (processing block 103). This may be accomplished by looking at the possible values achievable in the color space. In one embodiment, the processing logic chooses a CMYK value (e.g., an 8-bit value representing a color combination of C, M, Y and/or K) for each group. After choosing a representative color value for each group, processing logic calculates, for each group, the number of ink dots of the output color set are needed to achieve a color that is closest to the target color for that group of that block (processing block 104). Then, for each group, processing logic constructs a final distribution of printing colors and arranges ink dots for each group (e.g., C, M, Y, R, G, B, K, and W dots) (processing block 105) and, for each group, arranges the pixels in a pre-set order (for instance, sorted by luminance) according to numbers of an arrangement mask that covers the group (processing block 106).

Figure 2:
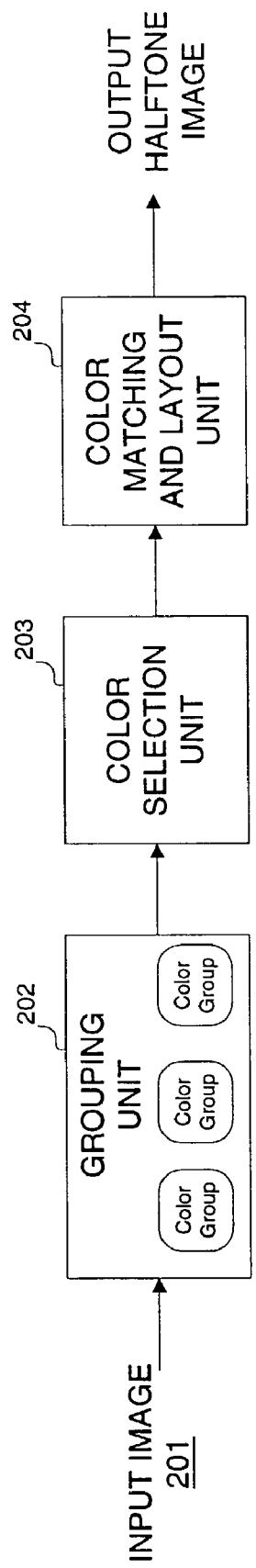
FIG. 2 is a block diagram of one embodiment of a block quantization system for color halftoning.

FIG. 2 is a block diagram of one embodiment of a block quantization system for color halftoning. The block quantization system performs a color match between the input domain of the system and the output domain of the system to achieve color halftoning where the number of colors in the input domain is greater than the number of available colors in the output domain. The system performs the color matching by dividing images in the input and output domains into multiple blocks and matching the color average of each block in the image in the input domain with a color average for a block in the image in the output domain. The blocks may be any shape, including complex shapes that are combinations of two or more shapes. For example, the blocks may be a square (d×d), but they may be rectangular (d×b) where d and b are not equal.

In one embodiment, the input domain comprises a computer system having a monitor and the output domain comprises a printer. For each small block of an input image, the block quantization technique described herein computes a set of the printing colors for a corresponding output block that best renders (under a principled distance measure in one embodiment) the input block's color average. In one embodiment, the technique described herein treats each input color as a 3-dimensional (3D) vector in color space and, in one embodiment, generates halftones using the actual output colors obtained in a subtractive printing process. In this manner, the halftoning technique described herein ensures that for each local input region the average color matches the average color of the corresponding local output region, where the regions are small enough to ensure that the eye averages over them. The block quantization technique exploits the higher spatial resolution of the printing process to achieve better color resolution and attempts to yield constrained local color optimality. Speckle, texture, and other artifacts common with error-diffusion methods are substantially avoided.

Referring to FIG. 2, an input image 201 is received by a block creation unit 202 that divides input image 201 into blocks. In one embodiment, the blocks are fixed-size.

A grouping unit 202 groups the image pixels in each block into up to a predetermined number of groups. The groups are based on the pixel's color. Alternatively, the groups could be based on pixel spatial location. In one embodiment, the predetermined number of groups is four, such that grouping unit 202 groups the image pixels in each block into four groups. Alternatively, grouping unit 202 may group the image pixels into up to three different color groups.

A color selection unit 203 selects a representative color value for each group. For example, color selection unit 203 may select a color value to represent the group. The color value may be an 8-bit CMYK value representing an average of C, M, Y and/or K colors (e.g., an average of the C, M, Y and/or K values when the (C, M, Y, K) values equal (30, 0, 15, 50)).

Given an input block's color average as a target, a color matching and layout unit 204 calculates the number of dots of the output color space that are needed for each group so that a set of output colors will average as close as possible to the target value. In one embodiment, color matching and layout unit 204 computes the output color set by examining the possible values achievable in the color space of the output image and identifying the closest achievable value to the target. For example, color matching and layout unit 204 calculates how many dots of C, M, Y and K are needed for each group. Thereafter, color matching and layout unit 204 constructs a distribution of the dots of the output color set for each group. For example, color matching and layout unit 204 constructs a distribution of C, M, Y, R, G, B, K, and W dots for each group. Note that other distributions over any set of printable colors may be used.

Given the output color set, color matching and layout unit 204 positions the colors to achieve the desired color and to reduce, and potentially even minimize, artifacts and graininess. In one embodiment, for each group, the color matching and layout unit 204 arranges the pixels in luminance order according to the numbers of an arrangement mask that covers the group. This is described in greater detail below.

Dividing an Image into Small Blocks

One of the reasons halftoning is effective is because the human eye averages colors that are spatially near each other. Spatial color averaging also occurs in the input image, and thus the local color averages are matched between the input and output image by the teachings of the present invention described herein.

The block-based processing described herein is advantageous because the block color quantization can be implemented in parallel.

In one embodiment, images are described into 16×16 blocks. Alternatively, 12×12 blocks may be used or other block sizes. The larger the block the more color resolution is possible in the halftone. For example, with 2×2 blocks, each color is represented by only 4 dots; for example, there would only be five possible shades of cyan, and that leads to false contouring. CRT screens use up to 256 levels of any color dimension (R, G, B) at 75 dots per inch. Thus, at the right resolution of dpi, a 16×16 block (equals 256 levels of any printable color dimension) is sufficient to reproduce the same color depth as a monitor screen. However, in alternative embodiments, 12×12 blocks (=144 levels) may be used to create images without any false contouring.

Although bigger blocks are good for halftone color resolution, smaller blocks are better for computation and to validate the assumption that the dots form a small enough block that the eye does in fact average the color over the block. Most importantly, the smaller the block size at a given dpi, the less likely it is that the eye will notice the blocks. If there is a strong edge within the block, the eye will be sensitive to the edge and not blend over an edge with sizable spatial extent. In order to capture edge information within a block, each block may be divided up into color groups as described below.

Grouping Pixels in Each Block

In case there is an edge in a block, or a strong variation over a block, the pixels in each block are grouped into up to four groups based on color value. These are referred to herein as color groups. If the block size is kept small, three groups is typically all that is needed, and at most four groups would be needed. For 12×12 blocks, three groups typically captures all the edges, but with 16×16 blocks it might be necessary to break blocks into up to four groups. In one embodiment, the number of groups could be determined analytically. The analytic determination may be based on human visual frequency characteristics for a given input dpi.

In one embodiment, the pixels are grouped based on their color values, and not based on their spatial location. In that way, any variation of edges within the block may be captured. In one embodiment, the pixels are grouped based on their YCbCr color value rather than on their RGB color values, although this is not required. As is well known in the art, YCbCr is an opponent colorspace, so Y represents the luminance and Cb and Cr are chrominance channels.

A color space conversion may be made according to the following equations:

$$Y=0.299R+0.587G+0.114B$$

$$Cb=-0.169R+-0.331G+0.5B$$

$$Cr=0.5R-0.418G-0.081B$$

Other colorspaces that may be used include YUV, CIELab and CIELuv.

Figure 3:
FIG. 3 illustrates three examples of grouping pixels.
Figure 3:
Figure 3:
Figure 3:
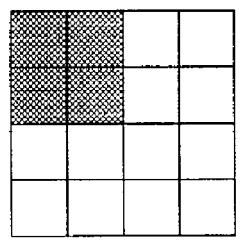
Figure 3:
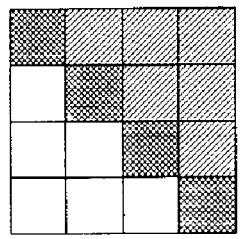
Figure 3:
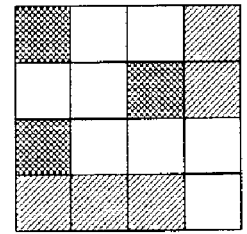

FIG. 3 illustrates three examples of grouping pixels. Referring to FIG. 3, the 4×4 image blocks are grouped into four groups, each by color and not by location.

Figure 4:
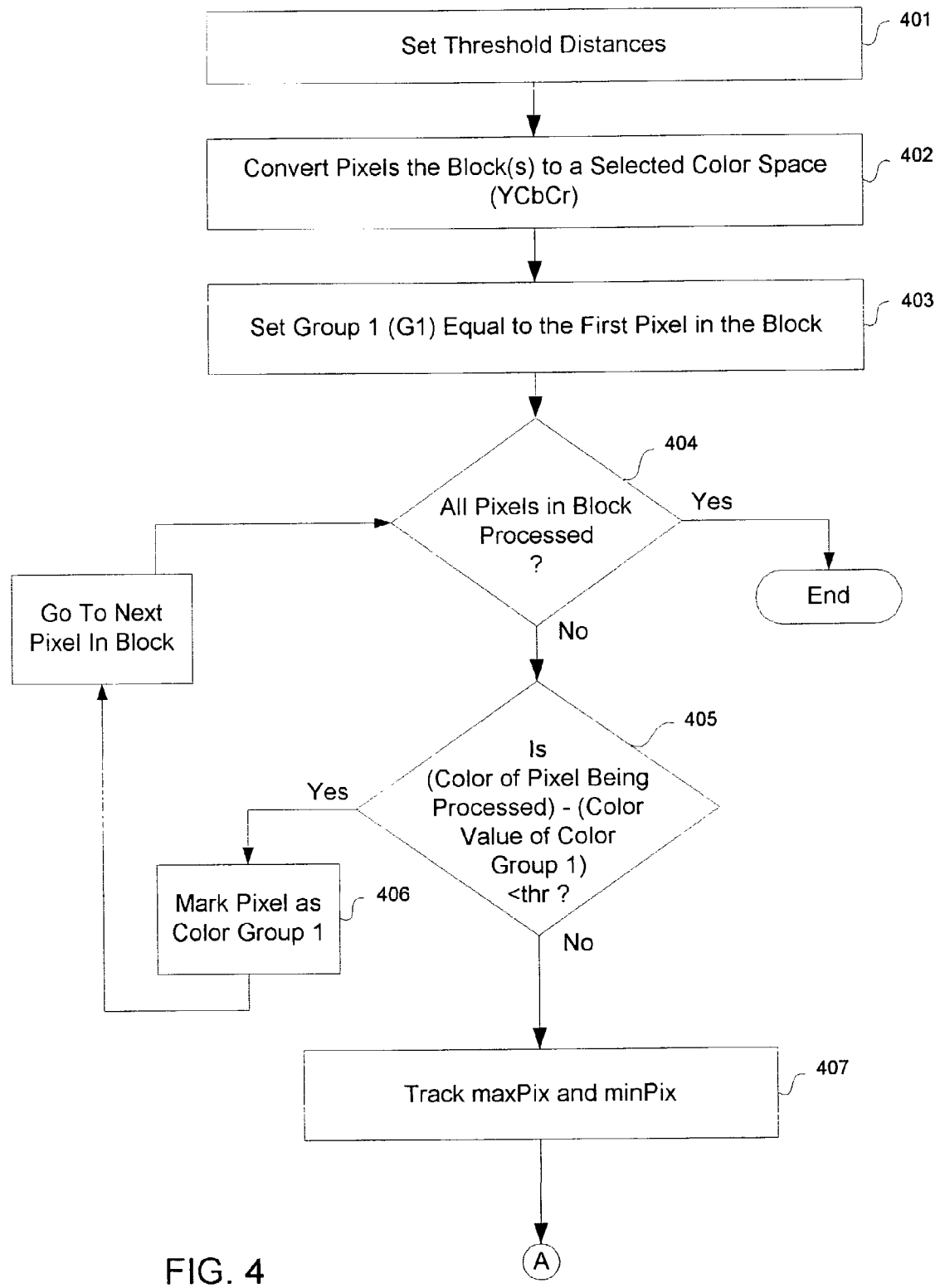
FIG. 4 is a flow diagram of one embodiment of a process that may be used to take the pixels in an image block and locate clusters.
Figure 4:
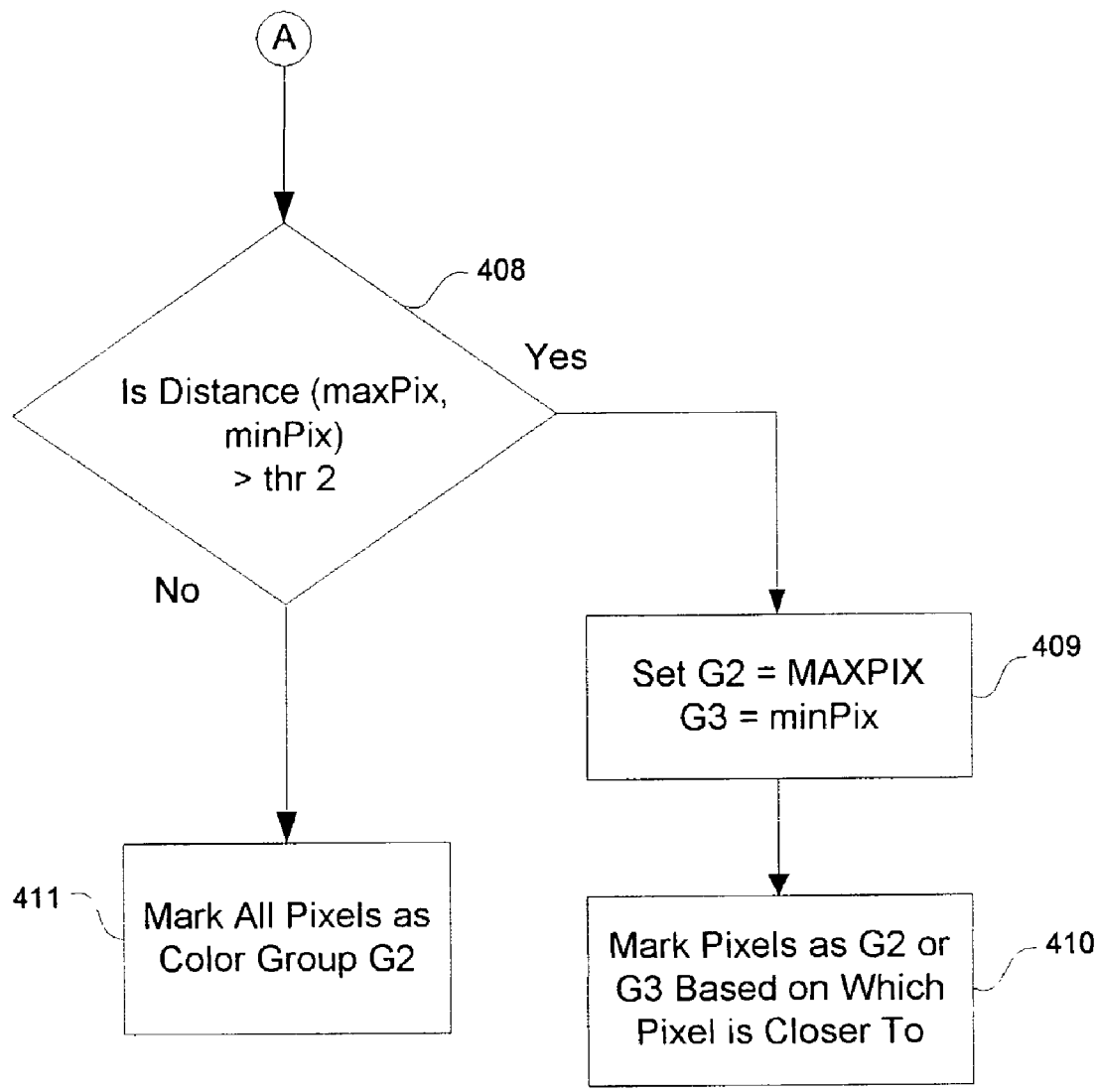

FIG. 4 is a flow diagram of one embodiment of a process that may be used to take the pixels in an image block and locate clusters. This process works quickly and identifies the important groups a majority of the time. This embodiment uses three color groups, although any number of color groups could be used. In the following discussion, the averages of each group are referred to as G1, G2, and G3. The process creates a vector grp having a size equal to the number of pixels in the block, whose entries mark the group to which each pixel in the block belongs.

Referring to FIG. 4, processing logic sets threshold distances thr and thr2 that specify how far apart two color values should be to be counted as different colors (processing block 401). Thresholds of 10 YCbCr units work well empirically, but thresholds that depend on the region of color space ought to work even better (the number of thresholds is related to the number of groups.)

After the threshold distance has been specified, processing logic converts the pixels in the block to YCbCr (or some other previously selected color space) (processing block 402). After converting pixels in the block to the different color space, processing logic sets G1 equal to the first pixel in the block (processing block 403). Processing logic tests whether all the pixels in the block have been processed (processing logic 404), thereby indicating that the end of the block has been reached. If this is the case, then processing ends. However, if this is not the case, then processing logic iterates through all the pixels in the block.

For each pixel u, processing logic determines if the difference between the color of the pixel u and the color value of color group G1 is less than a threshold thr (distance (u, G1)<thr) (processing block 405). As discussed above, a threshold of 10 YCbCr units may be used. If the distance (u, G1)<thr), then processing logic marks pixel u as belonging to group 1: (grp[u]=1) (processing block 406). If not, processing logic keeps track of which pixel of all the pixels not marked group 1 is the maximum and minimum distance away from the origin (0,0,0) (processing block 407). These two values are referred to maxPix and minPix. Processing logic determines if the distance between maxPix and minPix is greater than the threshold thr2 (distance (maxPix, minPix) >thr2) (processing block 408). If so, processing logic sets G2 equal to maxPix and G3 equal to minPix (processing block 409) and iterates through all the pixels in the block not marked as group 1 and marks each pixel as group 2 or group 3 depending if the pixel is closer to G2 or to G3 (processing block 410).

If processing logic determines that the distance between maxPix and minPix is not greater than the threshold thr2 (distance (maxPix, minPix)<=thr2), then processing logic marks all pixels as color group G2 (processing block 411) if they are not marked already color group G1. In one embodiment, threshold thr2 comprises 10 YCbCr units.

The end result of the process of FIG. 4 is that all pixels in the block are marked G1, G2, or G3, and belong to the corresponding group.

In processing blocks 405 and 408 of the grouping process, the distance between each pixel u and G1, G2, and G3 was measured by an $l_\infty$ distance, but the $l_2$ (Euclidean) distance as well as other distance measure may be used as well. The $l_\infty$ distance measures the distance between two multidimensional points as the maximum distance between the two points over all the dimensions.

If the thresholds thr and thr2 are high, then the image block is more likely to not split into separate groups. If the thresholds thr and thr2 are low, then the image block will be sensitive to color variations within the block and easily break into two or three groups. As mentioned above, a value of 10 for thr and thr2 works well (assuming the distance in is measured in $l_\infty$ distance) in YCbCr space.

Alternatively, there are many algorithms that could be used, including, for example, but not limited to, k-means, expectation-maximization, and hierarchical clustering techniques, that will take the pixels in an image block and group the pixels into clusters based on color.

Image Upsampling and Downsampling

If the input and output dpi are the same, then the input pixels that a group represents become the output dots to which the group will map. However, if the output dpi is different, then each group is re-mapped to the lower/higher dpi.

Choose a Representative Color for Each Group

After grouping pixels in each block group, a representative color for each group is chosen For example, for three blocks, the representation colors for the groups may be referred to as (C1, M1, Y1, K1), (C2, M2, Y2, K2) and (C3, M3, Y3, K3).

In one embodiment, the processing logic represents a group by its color average. As pixels are added to a group, their value can be added into the running mean and the actual pixel value need not be saved. In another embodiment, the median or vector median color of a group may be used as the representative color.

One disadvantage to taking the average color of the group is that first one must read through all the pixels and group them, and then read through again to find the average for each group. This could be avoided by using G1, G2, and G3 as the representative colors for the groups, but the resulting images may tend to appear too sharp. In busy areas where there are many colors, such as on a colored map with colored text, dominant colors can be missed by not using the color average.

Calculate Dots of Output Colors (e.g., C, M, Y, K)

In one embodiment, prior to calculating dots of the output colors, each input block is associated with up to three (or four) groups. Processing logic spatially remaps the groups onto the output blocks. If input and output blocks are the same size, this is trivial. In an alternative embodiment, where the input blocks and output blocks are not the same size, a spatial mapping could be used to map between input pixels and output dots for a block. Therefore, each output block has up to three groups, represented by the colors, e.g., (C1, M1, Y1, K1), (C2, M2, Y2, K2) and (C3, M3, Y3, K3) and covering respectively d1, d2, and d3 dots in the output block.

Then, in one embodiment, group one gets the following amount of dots of C, M, Y and K:

$$C1\text{dots}=d1*C1/255$$

$$M1\text{dots}=d1*M1/255$$

$$Y1\text{dots}=d1*Y1/255$$

$$K1\text{dots}=d1*K1/255$$

The amount of dots for each of the other groups is calculated in the same way. Note that the 255 above is for 8 bit color values. In other embodiments having more or less color values, the 255 is replaced with the maximum color value.

However, the total number of color dots attributed to a group, such as C1dots+M1dots+Y1dots+K1dots, may be up to four times the number of spatial dots, d1, that the group has. For instance, if C1=M1=Y1=K1=255, then C1dots=M1dots=Y1dots=K1dots=d1, then the total is 4d1. On the other hand, if the color values for a group were all zero, then there would be no dots assigned to the group at all. In calculating the final dot distribution, this issue is resolved by converting some of the C, M and Y dots to R, G, B, K and W dots so that the total is exactly equal to the number of dots the group covers. Thus, a final distribution of printing colors is made.

Calculate the Final Dot Distribution

After calculating the dots, a final dot distribution is calculated. In one embodiment, this conversion converts the CMYK dot distribution for a group into a distribution over CMYKRGBW that consists of the correct number of dots for the group.

Since the eye is more sensitive to high frequencies in luminance than in chrominance, a color patch of low luminance variation will appear less grainy than a patch of high luminance variation. Graininess can be expressed as a measure of local color variance, see, for example, ISO standard ISO/IEC 13660:2001.

Figure 5:
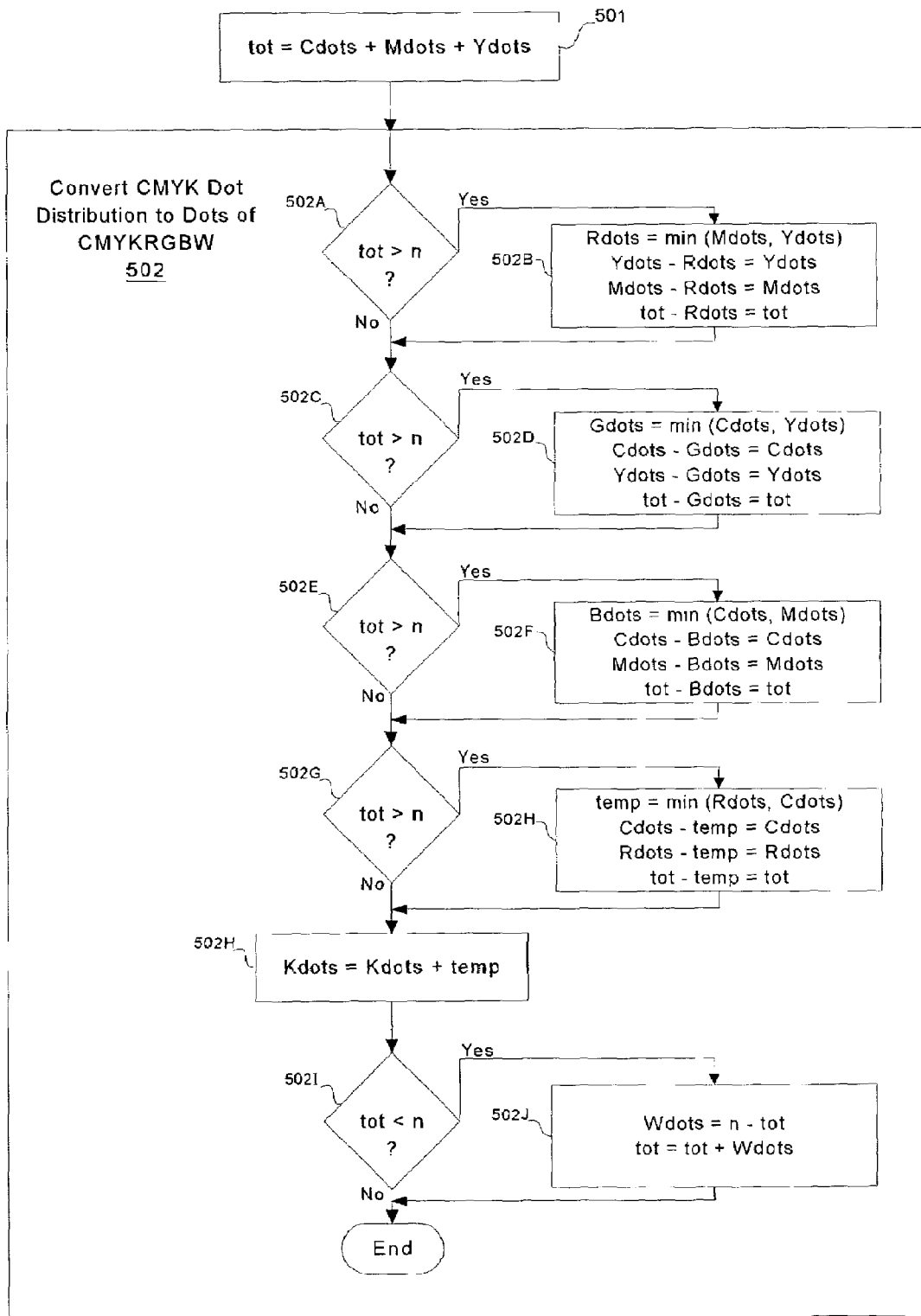
FIG. 5 is a flow diagram of one embodiment of a process for calculating a final dot distribution.

Because of this, the present invention attempts to reduce, and potentially minimize, luminance variations of the halftone dots. FIG. 5 illustrates such a process. The following process is very fast and gives smoother results than other ways to convert CMYK dot distribution to a CMYKRGBW distribution.

In FIG. 5, min(A,B) equals the minimum of A or B, n is the number of dots assigned to the group, and tot is the total number of colored dots assigned.

At the beginning, for each group, processing logic initially sets tot equal to the number of dots for the total of C, M and Y as follows:

$$tot=C\text{dots}+M\text{dots}+Y\text{dots}$$

(processing block 501).

Thereafter, for each group, processing logic converts its CMYK dot distribution to n dots of CMYKRGBW (processing block 502). This conversion occurs in a number of operations. First, processing logic determines if (tot>n) (processing block 502A). If so, processing logic set Rdots=min (Mdots, Ydots), and subtracts Rdots from Mdots, Ydots, and tot (processing block 502B). Then processing logic then determines if (tot>n) (processing block 502C). If so, processing logic sets Gdots=min(Cdots, Ydots), and subtracts Gdots from Cdots, Ydots and tot (processing block 502D). Then processing logic then determines if (tot>n) (processing block 502E). If so, processing logic set Bdots=min(Cdots, Mdots) and subtracts Bdots from Cdots, Mdots and tot (processing block 502F). Then processing logic then determines if (tot>n) (processing block 502G). If so, processing logic set temp=min(Rdots, Cdots), subtracts temp from Cdots, Rdots, and tot, and sets Kdots=Kdots+tempo (processing block 502H). Then processing logic then determines if (tot<n) (processing block 502I). If so, processing logic sets Wdots=n−tot and tot=tot+Wdots (processing block 502J).

Arrange Each Block's Dots

Given a set of ink dots for a block (divided up among the block's groups), there are a number of arrangements of dots that may be used. Dots may be arranged randomly, or spatially alternating between the colors within each block. However, this may lead to a randomness in the overall image that is disturbing to the human eye. This randomness is seen in the wide spectrum of spatial frequencies that are created, and it makes the halftone look grainy.

Alternatively, since the halftoning process only adds or distorts spatial frequencies outside the visual band such as in blue noise halftoning, which pushes the halftone distortions into high spatial frequencies where the eye is not as sensitive, a good way to achieve blue noise halftones and good image quality is to use a blue noise dither mask (a dispersed dot dither mask) to arrange the block dots. Example masks are shown in FIGS. 8 and 9. The mask used may be bigger or the same size as the block size. In one embodiment, processing logic arranges the dots in roughly luminance order to achieve best results. The order is important to ensure that dots of close appearance, like blue dots and black dots, do not clump together in the halftone and cause the halftone to look grainy. In one embodiment, an order to separate the colors is used, which is not quite luminance order, but rather K B C G R M Y W. Lastly, processing logic iterates through the ordered dots and places a dot at the next mask number within the spatial domain of that group within the block.

In one embodiment, processing logic arranges the ink dots for each group in the block in special order: K B C G R M Y W and then proceeds in order through the numbers of the mask covering the block. Each number covers an output pixel, and that output pixel is assigned the next ink color from the group to which the pixel belongs.

FIGS. 6A and 6B show an example where the block had no edges and therefore only one group. Referring to FIGS. 6A and 6B, the 4×4 block has one group and an ink combination is 5K, 3R, 7M, and 1Y. Using the example arrangement mask for a 4×4 block that is shown in FIG. 6A, the dots are arranged by placing the dots in order according to the mask. For example, the first set of dots is 5K, and one K is placed at the location of the first five number in the mask (1–5). This is shown in FIG. 6B. Once all five K's have been placed, the next set of colors, the 3Rs, are placed at the next three numbers in the mask (6–8). After 3Rs have been placed, the 7Ms are placed, one each at the next 7 locations specified in the mask (9–15). Finally, the single Y is placed at the last location in the mask (16). FIG. 6B illustrates the resulting arrangement of inks.

Figures 7A, 7B, 7C:
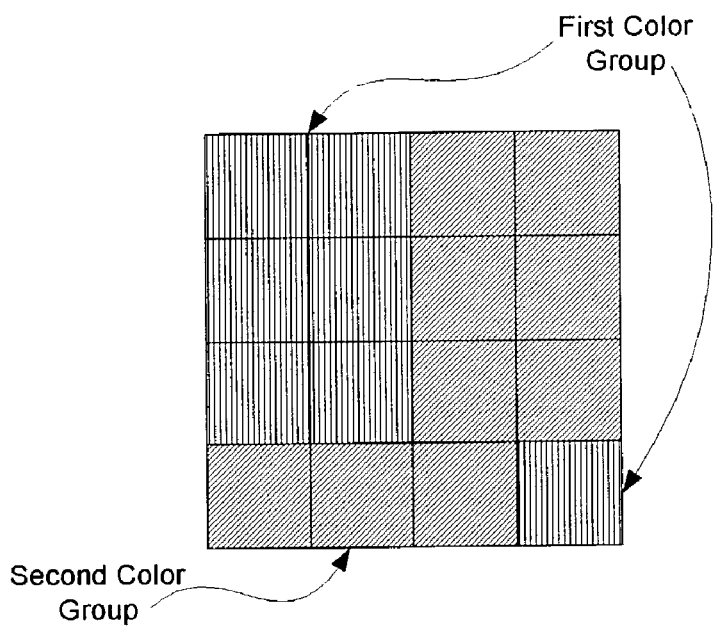
FIGS. 7A–7C illustrate an example of a block having two groups.

FIGS. 7A–C show an example where the block was split into two groups (FIG. 7A), where group 1 comprises 7C (cyan) and groups 2 comprise 4K and 5R. Using the same example arrangement mask (FIG. 7B), the dots are arranged. Proceeding numerically through the mask, the next color dot is placed from a particular group, group 1 or 2 in this case, depending on the location in the arrangement mask and whether that location is in group 1 or group 2. More specifically, location 1 in the arrangement mask is in group 1, so the first of the 7C is placed there. However, locations 2 and 3 in the arrangement mask are in color group 2. therefore, the first 2Ks of the 4Ks to be placed are put at these locations. Next, location 4 in the arrangement mask is in color group 1. Therefore, the next dot from color group 1 (the second of the 7Cs) is placed there. This pattern continues until the resulting arrangement of inks is made such as is shown in FIG. 6C.

To minimize the number of isolated dots in the halftone, or for other robustness reasons, one could use a clustered dot dither mask.

Different blue noise masks worked better for different devices. For certain laser copiers, it was important to spread out the low numbers maximally, so that low ink density regions achieved a very blue spectrum. At middle ink densities, it is important to have some strong frequencies at the harmonic of the block size, for example with a 12×12 block size the mask should have strong 6×6, 4×4, 3×3 and 2×2 frequencies. This helps swamp out the perception of the 12×12 spatial frequency structure from the blocks themselves. The blue noise bn144 dispersed dither mask of FIG. 8 does a good job of this and looks good over all ink density ranges. However, so many strong spatial frequencies increases the risk of moire. To halftone images that were clustered dot halftones another mask is used, namely the e46 dispersed dither mask in FIG. 9. The bn144 mask is based on recursive tessellation.

There are a number of advantages with the BCQ approach described above. Many of these advantages are in comparison to error diffusion or dithering techniques. First, unlike standard error diffusion, the BCQ technique described herein halftones each block independently, so it can be implemented in parallel. Also, there are very few calculations to perform for each block. Although dither may be performed in parallel, it does not provide the same quality as error diffusion and the BCQ technique has sharper edge areas and smoother smooth areas. That is, dither is a process by which the original signal has noise added to each pixel, and then each pixel is individually quantized. Block color quantization quantizes blocks of pixels at a time, and there is no noise addition. The added noise of dither means that edges are noisy, and thus not as true spatially to the image edge. Also, the added noise of dither means that smooth areas are likely to be not as smooth.

Furthermore, BCQ halftones are smoother than dither or error diffusion because there is lower luminance variation within a color patch. For example, consider a patch of 50% C dots and 50% Y dots. Error diffusion or dither halftone the color planes independently and thus, on average, 25% of dots in the patch will have Y on top of C(=G), 25% of the dots will be Y without C, 25% of the dots will be C without Y, and 25% of the dots will be blank or W. The BCQ technique described herein considers all the color planes at once. Thus, the same patch would have 50% C dots and 50% Y dots, no G or W dots. Therefore, the color variance (and especially, the luminance variance) of the dots in the patch will be lower for the BCQ halftone, and the resultant lower color dot contrast leads to easier color averaging for the human visual system, and hence smoother halftones.

Also noteworthy, the BCQ technique described herein saves ink and toner, resulting in savings in cost, speed, sharpness, and the environment. The BCQ technique saves toner or ink by not printing color dots on top of black dots. The technique simply never allows colors like Y+K to be chosen. Experimentally a savings of an average of 19% was found for natural images. It may be possible to translate that ink savings into a direct cost savings.

The advantages to reducing ink or toner usage are numerous: cost savings and improved marketability, potentially faster process, clearer text and fine lines, and less use of toner/ink is better for the environment.

Moire can be a problem when close spatial frequencies beat against each other. Although there is a regular block structure to BCQ halftoning, each block breaks up along any edge that may be present, so in most images there was no more moire than with error diffusion. Specifically, for high frequency line tests, straight and circular lines, there was no increase in moire. For clustered dot halftone images (patches of clustered dot halftones, now being re-halftoned) there was a small increase in moire. This small increase can be removed by changing from the bn144 mask (FIG. 8), which has a regular structure within each 12×12 block, to the e46 mask, which does not have a regular structure within each block (the e46 mask is shown in FIG. 9). Using the e46 mask (FIG. 9) when there is no risk of moire leads to more visible blockiness.

There is a blockiness associated with the 12×12 repeated mask. It is a subtle effect and only noticeable in some areas, but it is noticeable even at 12 inches viewing distance and it may be noticeable in important regions like skin areas. It is the worst artifact associated with BCQ halftoning. With respect to blockiness, BCQ adaptively trades off color and spatial resolution, but only within a small block. Because the largest feature in BCQ halftoning is the block, there are no artifacts at spatial frequencies lower than the block frequency (other than the possibility of moire). At the block frequency, there may be some visible 'blockiness'. Luckily, the human visual system is not sensitive to high spatial frequencies. Since the block size does not rise with dpi, the absolute spatial frequency of the blocks goes up as the dpi goes up.

There are two solutions to the blockiness, one is to get rid of it, perhaps by using larger masks described above or using hexagonal masks described above. The other solution is to wait until dpi is high enough that no one notices the blocks. That is, as dpi goes up block size stays the same, and thus the spatial frequency of the blocks rises past the human visual zone. Like the halftoning effect itself, the blocks become like pixels that the human visual system doesn't even register. The analysis for vanishing blockiness at high dpi is described above, and should take place by 1800 dpi.

Low density areas and light colors are better rendered by BCQ halftoning. The BCQ halftoning renders these areas with minimal luminance variation and regular spacing which appears smoother than the darker wormies produced by error diffusion. Furthermore, the error diffusion artifacts (e.g., the dark wormies on a light background) are at a lower spatial frequency, and thus will require a higher dpi to disappear than the regular blocks of BCQ.

Error diffusion creates worm-like runs of dots and other large-scale artifacts that may be noticeable as graininess or as wormies. BCQ halftoning has no worm-like artifacts or graininess.

BCQ does not have the color noise or graininess that errror diffusion has, but it does sometimes suffer from blocking artifacts. When the blocking is not noticeable, the BCQ halftone looks smoother. At higher dpi, when the blocking is visually suppressed, it is expected that the BCQ halftones to always look smoother. Particularly at lower densities and for yellows, the BCQ halftones look smoother.

ALTERNATIVE EMBODIMENTS

Ideally one would only have to read through pixels once. In one embodiment, the BCQ technique described herein reads through a block of pixels, groups them, and then reads through again to find the average of each group. By changing the way the grouping is done (i.e. for any pixel further than X away from the other centroids, create a new group), or by changing the representative of a group to not be the average, one should be able to read only once, requiring no buffering.

In another embodiment, K+C+M or another overprinted black, like K+C or K+M, is included as an ink option to achieve dark dark black. The darkest dot that BCQ will print is K. However, black ink is not perfectly absorbing, and so a patch of K+C+M appears even darker than a patch of black. If this is indeed a problem it should be fixable by including K+C+M as an ink option.

BCQ for Image or Video Compression

Block color quantization may be extended image or video compression. For example, consider the following BCQ-style encoding method:
1) For each small block in the image cluster its colors into up to two (or four) color groups, and mark for each pixel which group it belongs to.
2) For each group of each block, find the average color.
3) Cluster all the average colors in the image, then create a codebook or palette of average colors.
4) Code the palette color and difference for each group of each block.

Run-length encoding or a dictionary (or codebook) of block 0/1 maps would save more bits. Hierarchical palettes or differentially coding the differences to palette colors might save more bits. The coding method as stated is necessarily lossy at the block group level, but the decode can be smarter than just creating a blocky output.

A simple decoder just displays the right palette color and difference for each group of each block. A smarter decoder would interpolate between similar blocks and thus restore gradients and shading.

This idea is reminiscent of JBIG dictionaries and VQ codebooks and possibly other compression schemes. It is model-based in the sense that similar objects or textures would have similar encodings. It would be possible to do progressive decoding and edges would be well preserved.

Exemplary Applications

Figure 10:
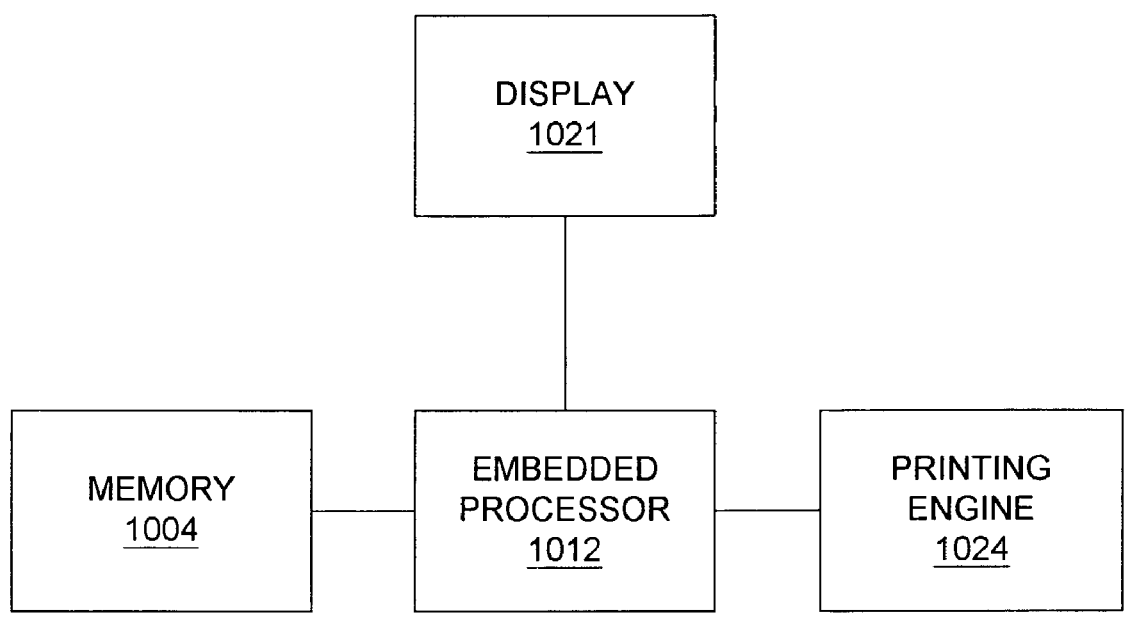
FIG. 10 is a block diagram of an exemplary system.

In one embodiment, the block color quantization is performed by an embedded processor in a system, such as, for example, a copier or a printer. The algorithm might be on an application specific integrated circuit (ASIC). FIG. 10 is a block diagram of an exemplary system that may include processing for the block quantization technique described above.

Referring to FIG. 10, system 1000 comprises an embedded processor 1012 coupled with the embedded processor 1012 for processing information. System 1000 further comprises a random access memory (RAM), or other dynamic storage device 1004 coupled to embedded processor 1012 for storing information and instructions to be executed by embedded processor 1012.

Computer system 1000 may further be coupled to a display device 1021, such as a cathode ray tube (CRT) or liquid crystal display (LCD), coupled to embedded processor 1012 for displaying information to a system user. An alphanumeric input device, including alphanumeric and other keys, may also be included in the system for communicating information and command selections to embedded processor 1012. An additional user input device is cursor control, such as a mouse, trackball, trackpad, stylus, or cursor direction keys, may be included in the system for communicating direction information and command selections to processor 1012, and for controlling cursor movement on display 1021.

A print engine 1024 is coupled to embedded processor 1012. In one embodiment, the print engine 1024 is part of a copier. Note that any or all of the components of system 1000 and associated hardware may be used in the present invention. However, it can be appreciated that other configurations of the system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
   dividing an input image into a plurality of blocks;
   clustering pixels in each of the plurality of blocks into a plurality of color groups;
   block quantizing each of the plurality of color groups for each of the plurality of blocks to a representative color value; and
   creating an output halftone image having a distinct block associated with each block in the plurality of blocks, with the representative color value for each group in each distinct block being approximated over a spatial area covered by the group in said each distinct block.

2. The method defined in claim 1 wherein the plurality of groups comprises up to three groups.

3. The method defined in claim 1 wherein the plurality of groups comprises up to four groups.

4. The method defined in claim 1 wherein the representative color value for at least one of the plurality of color groups is an average color value of the one or more colors in the one color group.

5. The method defined in claim 1 wherein the operations of clustering colors in each of the first plurality of blocks into a plurality of color groups, block quantizing each of the plurality of color groups for each of the first plurality of blocks to a representative color value, and creating an output halftone image having a distinct block associated with each block in the first plurality of blocks are performed in parallel.

6. The method defined in claim 1 wherein the input image is divided into 12×12 blocks.

7. The method defined in claim 1 wherein the input image is divided into 16×16 blocks.

8. The method defined in claim 1 wherein clustering pixels in each of the plurality of blocks into a plurality of color groups is based on pixel color values.

9. The method defined in claim 1 wherein clustering pixels in each of the plurality of blocks into a plurality of color groups is based on pixel spatial location.

10. The method defined in claim 1 wherein clustering pixels in each of the plurality of blocks into a plurality of color groups is based on opponent color space pixel color values.

11. The method defined in claim 1 wherein clustering pixels in each of the plurality of blocks into a plurality of color groups comprises creating a vector for each of the plurality of blocks with a size equal to a number of pixels in said each block, entries in the vector being marked to indicate to which color group each pixel belongs.

12. The method defined in claim 1 wherein clustering pixels in each of the plurality of blocks into a plurality of color groups comprises:
    iterating through pixels in the block including
       comparing a color of each pixel in each block to a color representative of one or more groups, and
       marking pixels as belonging to one of the plurality of color groups based on the distance in color to a color representative of the one color group being less than a predetermined distance.

13. An apparatus comprising:
    means for dividing an input image into a plurality of blocks;
    means for clustering pixels in each of the plurality of blocks into a plurality of color groups;
    means for block quantizing each of the plurality of color groups for each of the plurality of blocks to a representative color value; and
    means for creating an output halftone image having a distinct block associated with each block in the plurality of blocks, with the representative color value for each group in each distinct block being approximated over a spatial area covered by the group in said each distinct block.

14. The apparatus defined in claim 13 wherein the plurality of groups comprises up to three groups.

15. The apparatus defined in claim 13 wherein the plurality of groups comprises up to four groups.

16. The apparatus defined in claim 13 wherein the representative color value for at least one of the plurality of color groups is an average color value of the one or more colors in the one color group.

17. The apparatus defined in claim 13 wherein the means for clustering colors in each of the first plurality of blocks into a plurality of color groups, the means for block quantizing each of the plurality of color groups for each of the first plurality of blocks to a representative color value, and the means for creating an output halftone image having a distinct block associated with each block in the first plurality of blocks operate in parallel.

18. The apparatus defined in claim 13 wherein the input image is divided into 12×12 blocks.

19. The apparatus defined in claim 13 wherein the input image is divided into 16×16 blocks.

20. The apparatus defined in claim 13 wherein the means for clustering pixels in each of the plurality of blocks into a plurality of color groups operates based on pixel color values.

21. The apparatus defined in claim 13 wherein the means for clustering pixels in each of the plurality of blocks into a plurality of color groups operates based on pixel spatial location.

22. The apparatus defined in claim 13 wherein the means for clustering pixels in each of the plurality of blocks into a plurality of color groups operates based on opponent color space pixel color values.

23. The apparatus defined in claim 13 wherein the means for clustering pixels in each of the plurality of blocks into a plurality of color groups comprises means for creating a vector for each of the plurality of blocks with a size equal to a number of pixels in said each block, entries in the vector being marked to indicate to which color group each pixel belongs.

24. The apparatus defined in claim 13 wherein the means for clustering pixels in each of the plurality of blocks into a plurality of color groups comprises:
  means for iterating through pixels in the block including
    means for comparing a color of each pixel in each block to a color representative of one or more groups, and
    means for marking pixels as belonging to one of the plurality of color groups based on the distance in color to a color representative of the one color group being less than a predetermined distance.

25. An article of manufacture comprising one or more recordable media having executable instructions stored thereon which, when executed by a system, causes the system to:
  divide an input image into a plurality of blocks;
  cluster pixels in each of the plurality of blocks into a plurality of color groups;
  block quantize each of the plurality of color groups for each of the plurality of blocks to a representative color value; and
  create an output halftone image having a distinct block associated with each block in the plurality of blocks, with the representative color value for each group in each distinct block being approximated over a spatial area covered by the group in said each distinct block.

26. The article of manufacture defined in claim 25 wherein the representative color value for at least one of the plurality of color groups is an average color value of the one or more colors in the one color group.

27. The article of manufacture defined in claim 25 wherein operations of clustering colors in each of the first plurality of blocks into a plurality of color groups, block quantizing each of the plurality of color groups for each of the first plurality of blocks to a representative color value, and creating an output halftone image having a distinct block associated with each block in the first plurality of blocks are performed in parallel.

28. The article of manufacture defined in claim 25 wherein the instructions which cause the system to cluster pixels in each of the plurality of blocks into a plurality of color groups cause clustering, when executed by the system, based on pixel color values.

29. The article of manufacture defined in claim 25 wherein the instructions which cause the system to cluster pixels in each of the plurality of blocks into a plurality of color groups cause clustering, when executed by the system, based on pixel spatial location.

30. The article of manufacture defined in claim 25 wherein the instructions which cause the system to cluster pixels in each of the plurality of blocks into a plurality of color groups cause clustering, when executed by the system, based on opponent color space pixel color values.

31. The article of manufacture defined in claim 25 wherein the instructions to cluster pixels in each of the plurality of blocks into a plurality of color groups comprise instructions which, when executed by the system, cause the system to create a vector for each of the plurality of blocks with a size equal to a number of pixels in said each block, entries in the vector being marked to indicate to which color group each pixel belongs.

32. The article of manufacture defined in claim 25 wherein instructions which cause the system to cluster pixels in each of the plurality of blocks into a plurality of color groups comprises instructions which, when executed by the system, cause the system to:
  iterate through pixels in the block by, at least in part,
    comparing a color of each pixel in each block to a color representative of one or more groups, and
    marking pixels as belonging to one of the plurality of color groups based on the distance in color to a color representative of the one color group being less than a predetermined distance.

33. A method comprising:
  dividing an input image into a plurality of blocks;
  grouping image pixels in each block into a plurality of groups based on color of the image pixels;
  selecting a representative color for each of the plurality of groups;
  determining a distribution of ink dots of a color space to approximate the representative color for each of the plurality of groups;
  determining a final distribution of printing colors for each group; and
  arranging ink dots for each group based on an arrangement mask covering said each group.

34. The method defined in claim 33 wherein arranging pixels for each group based on an arrangement mask comprises arranging the pixels in luminance order according to numbers of the arrangement mask that covers said each group.

35. The method defined in claim 33 wherein the representative color for each of the plurality of groups comprises a color average of the colors in said each group.

36. The method defined in claim 33 wherein the representative color for each of the plurality of groups comprises a median color of the colors in said each group.

37. The method defined in claim 33 wherein the representative color for each of the plurality of groups comprises a vector median color of the colors in said each group.

38. The method defined in claim 33 wherein the number of ink dots comprises a combination of zero or more dots of cyan (C), magenta (M), yellow (Y) and black (K).

39. The method defined in claim 33 wherein determining a final distribution of ink dots for each group comprises converting a dot distribution for a group into a distribution over a predetermined ordering that comprises the correct number of dots for the group.

40. The method defined in claim 39 wherein the predetermined ordering comprises CMYKRGBW.

41. The method defined in claim 39 further comprising reducing luminance variations of the ink dots in the dot distribution.

42. The method defined in claim 33 wherein arranging ink dots for each group based on an arrangement mask covering said each group comprises arranging ink dots in an order comprising KBCGRMYW.

43. An apparatus comprising:
  means for dividing an input image into a plurality of blocks;
  means for grouping image pixels in each block into a plurality of groups based on color of the image pixels;
  means for selecting a representative color for each of the plurality of groups;
  means for determining a distribution of ink dots of a color space to approximate the representative color for each of the plurality of groups;
  means for determining a final distribution of printing colors for each group; and means for arranging ink dots for each group based on an arrangement mask covering said each group.

44. The apparatus defined in claim 43 wherein the means for arranging pixels for each group based on an arrangement mask comprises means for arranging the pixels in luminance order according to numbers of the arrangement mask that covers said each group.

45. The apparatus defined in claim 43 wherein the representative color for each of the plurality of groups comprises a color average of the colors in said each group.

46. The apparatus defined in claim 43 wherein the representative color for each of the plurality of groups comprises a median color of the colors in said each group.

47. The apparatus defined in claim 43 wherein the representative color for each of the plurality of groups comprises a vector median color of the colors in said each group.

48. The apparatus defined in claim 43 wherein the number of ink dots comprises a combination of zero or more dots of cyan (C), magenta (M), yellow (Y) and black (K).

49. The apparatus defined in claim 43 wherein determining a final distribution of ink dots for each group comprises means for converting a dot distribution for a group into a distribution over a predetermined ordering that comprises the correct number of dots for the group.

50. The apparatus defined in claim 49 wherein the predetermined ordering comprises CMYKRGBW.

51. The apparatus defined in claim 49 further comprising means for reducing luminance variations of the ink dots in the dot distribution.

52. The apparatus defined in claim 43 wherein the means for arranging ink dots for each group based on an arrangement mask covering said each group comprises means for arranging ink dots in an order comprising KBCGRMYW.

53. An article of manufacture comprising one or more recordable media having executable instructions stored thereon which, when executed by a system, causes the system to:
    divide an input image into a plurality of blocks;
    group image pixels in each block into a plurality of groups based on color of the image pixels;
    select a representative color for each of the plurality of groups;
    determine a distribution of ink dots of a color space to approximate the representative color for each of the plurality of groups;
    determine a distribution of printing colors for each group; and
    arrange ink dots for each group based on an arrangement mask covering said each group.

54. The article of manufacture defined in claim 53 wherein instructions which cause the system to arrange pixels for each group based on an arrangement mask comprises instructions which, when executed by the system, cause the system to arrange the pixels in luminance order according to numbers of the arrangement mask that covers said each group.

55. The article of manufacture defined in claim 53 wherein instructions which cause the system to determine a final distribution of ink dots for each group comprises instructions which, when executed by the system, cause the system to convert a dot distribution for a group into a distribution over a predetermined ordering that comprises the correct number of dots for the group.

56. The article of manufacture defined in claim 55 wherein the predetermined ordering comprises CMYKRGBW.

57. The article of manufacture defined in claim 55 further comprising instructions which, when executed by the system, cause the system to:
    reduce luminance variations of the ink dots in the dot distribution.

58. The article of manufacture defined in claim 53 wherein instuructions which cause the system to arrange ink dots for each group based on an arrangement mask covering said each group comprises instruction which, when executed by the system, cause the system to arrange ink dots in an order comprising KBCGRMYW.

\* \* \* \* \*